US011209679B2

(12) United States Patent
Schrans et al.

(10) Patent No.: US 11,209,679 B2
(45) Date of Patent: Dec. 28, 2021

(54) OPTOELECTRONIC MODULATOR, PHOTONIC INTEGRATED CIRCUIT, AND METHOD

(71) Applicant: ROCKLEY PHOTONICS LIMITED, London (GB)

(72) Inventors: Thomas Pierre Schrans, Temple City, CA (US); Dong Yoon Oh, Alhambra, CA (US); Aaron John Zilkie, Pasadena, CA (US)

(73) Assignee: Rockley Photonics Limited, Oxford (GB)

( * ) Notice: Subject to any disclaimer, the term of this patent is extended or adjusted under 35 U.S.C. 154(b) by 0 days.

(21) Appl. No.: 16/667,831

(22) Filed: Oct. 29, 2019

(65) Prior Publication Data
US 2020/0133034 A1 Apr. 30, 2020

(30) Foreign Application Priority Data
Oct. 30, 2018 (GB) ..................................... 1817733

(51) Int. Cl.
*G02F 1/025* (2006.01)

(52) U.S. Cl.
CPC .......... *G02F 1/025* (2013.01); *G02F 2203/06* (2013.01)

(58) Field of Classification Search
CPC ........ G02F 1/025; G02F 1/011; G02F 1/0136; G02F 1/015; G02F 1/035; G02F 1/225;
(Continued)

(56) References Cited

U.S. PATENT DOCUMENTS

| 4,492,436 A | 1/1985 | Bergmann |
| 5,473,459 A * | 12/1995 | Davis ...................... H04J 14/08 385/11 |

(Continued)

FOREIGN PATENT DOCUMENTS

| EP | 3 002 616 A1 | 4/2016 |
| EP | 3 009 869 A1 | 4/2016 |

OTHER PUBLICATIONS

Boeuf, F. et al., "A Multi-wavelength 3D-compatible Silicon Photonics Platform on 300mm SOI wafers for25Gb/s Applications", 2013, 4 pages, IEEE.
(Continued)

*Primary Examiner* — Andrew Jordan
(74) *Attorney, Agent, or Firm* — Lewis Roca Rothgerber Christie LLP (57) ABSTRACT

A photonic integrated circuit, an optoelectronic modulator, and a method of modulating light in a photonic integrated circuit are provided. The photonic integrated circuit comprises: an input waveguide which, in use, receives light in a superposition of two polarisation modes of the waveguide; a polarisation splitter, connected to the input waveguide, and configured to provide, at a first output, light in a first polarisation mode of the two polarisation modes of the waveguide and, at a second output, light in a second polarisation mode of the two polarisation modes of the waveguide; a first polarisation rotator, connected to the first output of the polarisation splitter, and configured to rotate light received therefrom from the first polarisation mode to the second polarisation mode; an optoelectronic modulator, having a first modulation waveguide connected to the first polarisation rotator and a second modulation waveguide connected to the second output of the polarisation splitter.

21 Claims, 8 Drawing Sheets

(58) Field of Classification Search
CPC .... G02F 1/2257; G02F 1/377; G02F 2203/06; G02F 2/00; G02F 2001/3135; H01P 3/00; G02B 6/09
See application file for complete search history.

(56) References Cited

U.S. PATENT DOCUMENTS

| | | | |
|---|---|---|---|
| 6,198,854 B1 | 3/2001 | Takagi | |
| 6,256,426 B1* | 7/2001 | Duchet | G02F 1/025 385/1 |
| 6,999,664 B2* | 2/2006 | Nicolaescu | G02B 6/126 385/11 |
| 7,002,733 B2* | 2/2006 | Dagenais | H04B 10/2914 359/337 |
| 7,006,717 B2* | 2/2006 | Liu | G02F 1/025 359/245 |
| 7,006,732 B2 | 2/2006 | Gunn, III et al. | |
| 7,013,070 B2* | 3/2006 | Nicolaescu | G02B 6/126 385/16 |
| 7,065,264 B2* | 6/2006 | Vonsovici | G02F 1/025 385/39 |
| 7,068,887 B1 | 6/2006 | Gunn, III et al. | |
| 7,116,847 B2* | 10/2006 | Liu | G02F 1/025 385/8 |
| 7,146,068 B2* | 12/2006 | Nicolaescu | G02B 6/126 385/16 |
| 7,228,015 B2 | 6/2007 | Watts et al. | |
| 7,272,271 B2* | 9/2007 | Kaplan | G02F 1/225 359/246 |
| 7,298,945 B2 | 11/2007 | Gunn, III et al. | |
| 7,702,188 B2 | 4/2010 | Little et al. | |
| 8,094,978 B2 | 1/2012 | Tokushima | |
| 8,238,697 B2 | 8/2012 | Little et al. | |
| 8,620,115 B2 | 12/2013 | Webster et al. | |
| 8,750,651 B2 | 6/2014 | Chen | |
| 8,913,854 B2 | 12/2014 | Chen | |
| 8,923,660 B2 | 12/2014 | Dorin et al. | |
| 8,948,549 B2 | 2/2015 | Picard et al. | |
| 9,110,241 B2 | 8/2015 | Chen | |
| 9,122,006 B1* | 9/2015 | Roth | G02B 6/126 |
| 9,405,007 B2* | 8/2016 | Luthi | G01S 17/36 |
| 9,417,469 B2* | 8/2016 | Abel | G02F 1/025 |
| 9,529,151 B2 | 12/2016 | Goi et al. | |
| 9,577,780 B2* | 2/2017 | Welch | H04B 10/40 |
| 9,606,293 B2 | 3/2017 | Ma | |
| 9,664,853 B2 | 5/2017 | Vermeulen | |
| 9,703,127 B2* | 7/2017 | Abel | G02F 1/025 |
| 9,720,437 B2* | 8/2017 | Gilbert | G02F 1/0136 |
| 9,825,727 B2* | 11/2017 | Welch | G02B 6/12007 |
| 9,841,561 B2 | 12/2017 | Ma | |
| 9,851,505 B2* | 12/2017 | Oka | G02F 1/011 |
| 9,864,141 B1 | 1/2018 | Lin | |
| 9,874,696 B2 | 1/2018 | Liu et al. | |
| 9,915,781 B1 | 3/2018 | Lin | |
| 9,977,187 B2 | 5/2018 | Shi et al. | |
| 10,078,232 B1* | 9/2018 | Vermeulen | G02B 6/1225 |
| 10,101,532 B1 | 10/2018 | Lin | |
| 10,133,002 B2 | 11/2018 | Lin | |
| 10,228,514 B2 | 3/2019 | Ma | |
| 10,338,316 B2* | 7/2019 | Nakano | H04B 10/5053 |
| 10,341,040 B2* | 7/2019 | Welch | G02B 6/34 |
| 10,393,967 B2 | 8/2019 | Piazza et al. | |
| 10,394,058 B1* | 8/2019 | Vermeulen | G02F 1/011 |
| 10,451,804 B2 | 10/2019 | Liu et al. | |
| 10,578,801 B2 | 3/2020 | Ma | |
| 10,591,672 B2 | 3/2020 | Van Thourhout et al. | |
| 10,615,903 B2* | 4/2020 | Welch | G02F 1/2257 |
| 10,684,416 B2* | 6/2020 | Lin | G02B 6/126 |
| 10,809,459 B2* | 10/2020 | Liu | G02B 6/2766 |
| 2003/0223698 A1* | 12/2003 | Nicolaescu | G02F 1/025 385/50 |
| 2004/0028418 A1* | 2/2004 | Kaplan | H04J 14/08 398/188 |
| 2004/0052466 A1* | 3/2004 | Nicolaescu | G02B 6/126 385/50 |
| 2004/0150876 A1* | 8/2004 | Dagenais | H04B 10/2914 359/344 |
| 2004/0184156 A1 | 9/2004 | Gunn, III et al. | |
| 2005/0111812 A1* | 5/2005 | Vonsovici | G02F 1/2257 385/140 |
| 2005/0175305 A1* | 8/2005 | Liu | G02F 1/025 385/129 |
| 2005/0286851 A1* | 12/2005 | Liu | G02F 1/025 385/129 |
| 2006/0008207 A1 | 1/2006 | Gunn, III et al. | |
| 2006/0018584 A1 | 1/2006 | Watts et al. | |
| 2006/0083457 A1* | 4/2006 | Nicolaescu | G02B 6/2793 385/8 |
| 2006/0280405 A1 | 12/2006 | Gunn, III et al. | |
| 2008/0019637 A1 | 1/2008 | Little et al. | |
| 2008/0080869 A1* | 4/2008 | Mitchell | G02F 1/225 398/147 |
| 2010/0002989 A1 | 1/2010 | Tokushima | |
| 2010/0202724 A1 | 8/2010 | Little et al. | |
| 2011/0222813 A1 | 9/2011 | Webster et al. | |
| 2012/0163750 A1 | 6/2012 | Chen | |
| 2013/0301094 A1* | 11/2013 | Gilbert | G02F 1/39 359/107 |
| 2014/0054263 A1 | 2/2014 | Chen | |
| 2014/0153862 A1 | 6/2014 | Picard et al. | |
| 2014/0348460 A1 | 11/2014 | Dorin et al. | |
| 2015/0063744 A1 | 3/2015 | Chen | |
| 2015/0078702 A1 | 3/2015 | Dorin et al. | |
| 2015/0309340 A1* | 10/2015 | Abel | G02F 1/035 385/2 |
| 2015/0338577 A1 | 11/2015 | Shi et al. | |
| 2016/0011371 A1 | 1/2016 | Vermeulen | |
| 2016/0036550 A1* | 2/2016 | Welch | H04J 14/0221 398/87 |
| 2016/0178842 A1 | 6/2016 | Goi et al. | |
| 2016/0246005 A1 | 8/2016 | Liu et al. | |
| 2016/0349546 A1* | 12/2016 | Abel | G02F 1/0316 |
| 2016/0377812 A1 | 12/2016 | Ma | |
| 2017/0153393 A1 | 6/2017 | Ma | |
| 2017/0163001 A1* | 6/2017 | Evans | G02B 6/12004 |
| 2017/0163369 A1* | 6/2017 | Welch | G02B 6/12007 |
| 2017/0205578 A1 | 7/2017 | Van Thourhout et al. | |
| 2018/0069649 A1* | 3/2018 | Welch | G02B 6/4215 |
| 2018/0081119 A1 | 3/2018 | Ma | |
| 2018/0100969 A1 | 4/2018 | Liu et al. | |
| 2018/0164505 A1 | 6/2018 | Lin | |
| 2018/0284348 A1 | 10/2018 | Lin | |
| 2018/0321445 A1 | 11/2018 | Piazza et al. | |
| 2019/0033520 A1* | 1/2019 | Lin | G02B 6/2766 |
| 2019/0187372 A1 | 6/2019 | Ma | |
| 2019/0258094 A1 | 8/2019 | Oh et al. | |
| 2019/0302361 A1 | 10/2019 | Oh et al. | |
| 2019/0310418 A1* | 10/2019 | Karimelahi | G02B 6/126 |
| 2019/0342026 A1* | 11/2019 | Welch | G02B 6/29397 |
| 2020/0003954 A1 | 1/2020 | Liu et al. | |
| 2020/0133034 A1* | 4/2020 | Schrans | G02F 1/025 |
| 2020/0158952 A1 | 5/2020 | Ma | |
| 2020/0174188 A1* | 6/2020 | Van Thourhout | G02B 6/2786 |

OTHER PUBLICATIONS

Lu, Zeqin et al., "Silicon Photonic Polarization Beamsplitter and Rotator for On-chip Polarization Control", 2016 IEEE 13th International Conference on Group IV Photonics (GFP), Shanghai, 2016, pp. 70-71, IEEE.

Zhang, Jing et al., "Silicon-Waveguide-Based Mode Evolution Polarization Rotator", IEEE Journal of Selected Topics in Quantum Electronics, Jan./Feb. 2010, pp. 53-60, vol. 16, No. 1, IEEE.

U.K. Intellectual Property Office Search Report, dated Oct. 29, 2018, for Patent Application No. GB 1807148.0, 4 pages.

U.K. Intellectual Property Office Search and Examination Report, dated May 1, 2019, for Patent Application No. GB 1817733.7, 6 pages.

U.K. Intellectual Property Office Search Report, dated Aug. 1, 2019, for Patent Application No. GB 1817733.7, 3 pages.

(56) References Cited

OTHER PUBLICATIONS

U.S. Notice of Allowance from U.S. Appl. No. 16/362,528, dated Jun. 12, 2020, 6 pages.
U.S. Notice of Allowance from U.S. Appl. No. 16/362,528, dated Oct. 28, 2020, 7 pages.
Alonso-Ramos, C. et al., "Polarization rotator for InP rib waveguide", Optics Letters, Feb. 1, 2012, pp. 335-337, vol. 37, No. 3, Optical Society of America.
Dai, D. et al., "Compact Polarization Beam Splitter Using an Asymmetrical Mach-Zehnder Interferometer Based on Silicon-on-Insulator Waveguides", IEEE Photonics Technology Letters, Apr. 15, 2012, pp. 673-675, vol. 24, No. 8, IEEE.
Goi, K. et al., "Low-loss partial rib polarization rotator consisting only of silicon core and silica cladding", Optics Letters, Apr. 1, 2015, pp. 1410-1413, vol. 40, No. 7, Optical Society of America.
Li, P.A. et al., "An integrated high-extinction-ratio low-loss polarization rotator for silicon photonics across C+L bands", CLEO, 2017, 2 pages, OSA.
Ma, M., et al., "Silicon Photonic Polarization Receiver with Automated Stabilization for Arbitrary Input Polarizations", CLEO, 2016, 2 pages, OSA.
U.K. Intellectual Property Office Examination Report, dated Jan. 15, 2020, for Patent Application No. GB 1807148.0, 4 pages.
Watts, M.R. et al., "Integrated mode-evolution-based polarization rotators", Optics Letters, Jan. 15, 2005, pp. 138-140, vol. 30, No. 2, Optical Society of America.

\* cited by examiner

OPTOELECTRONIC MODULATOR, PHOTONIC INTEGRATED CIRCUIT, AND METHOD

CROSS-REFERENCE TO RELATED APPLICATION(S)

The present application claims priority to United Kingdom Application No. GB 1817733.7, filed Oct. 30, 2018, the entire content of which is incorporated herein by reference.

FIELD

The present invention relates to an optoelectronic modulator, a photonic integrated circuit, and a method of modulating light.

BACKGROUND

Polarisation independent photonic integrated circuits, particularly for transmission, are core components for opto-application specific integrated circuit (opto-ASIC) applications. Whilst some modulators can be made or modified to be polarisation independent, some cannot.

To solve this issue, active polarisation control circuits have been developed. See for example, Z. Lu, M. Ma, H. Yun, Y. Wang, N. A. F. Jaeger and L. Chrostowski, "Silicon photonic polarisation beamsplitter and rotator for on-chip polarisation control," 2016 *IEEE 13th International Conference on Group IV Photonics (GFP)*, Shanghai, 2016, pp. 70-71. doi: 10.1109/GROUP4.2016.7739084. However these require at least one optical power sensor, two phase shifters, and a relatively complex control algorithm. The resulting circuit is technically complex to implement, and increases the power requirements of the opto-ASIC.

There is a desire then for a purely passive polarisation diverse circuit in which modulation can occur.

SUMMARY

Accordingly, in a first aspect, there is provided a photonic integrated circuit, comprising:
  an input waveguide which, in use, receives light in a superposition of two polarisation modes of the waveguide;
  a polarisation splitter, connected to the input waveguide, and configured to provide, at a first output, light in a first polarisation mode of the two polarisation modes of the waveguide and, at a second output, light in a second polarisation mode of the two of polarisation modes of the waveguide;
  a first polarisation rotator, connected to the first output of the polarisation splitter, and configured to rotate light received therefrom from the first polarisation mode to the second polarisation mode;
  an optoelectronic modulator, having a first modulation waveguide connected to the first polarisation rotator and a second modulation waveguide connected to the second output of the polarisation splitter, and configured to modulate light in each waveguide according to a modulation scheme;
  a first intermediate waveguide and a second intermediate waveguide, connected respectively to the first modulation waveguide and the second modulation waveguide;
  wherein one of the first intermediate waveguide and the second intermediate waveguide comprises a second polarisation rotator configured to rotate light received therein from one of the first and second polarisation modes to the other of the first and second polarisation modes; and
  a polarisation combiner, connected to the first intermediate waveguide and the second intermediate waveguide, and configured to combine light received from each and provide the combined light to an output of the photonic integrated circuit as a modulated signal.

The photonic integrated circuit according to the first aspect provides a passive polarisation diverse modulation circuit, thereby providing a polarisation independent modulation circuit even if the modulator(s) themselves are polarisation dependent. The modulators may be, for example, electro-absorption modulators or phase modulators.

According to some embodiments, there is provided a method of modulating light in a photonic integrated circuit, the method including the steps of: providing input light having a first power from an input waveguide, said input light being in a superposition of two polarisation modes of the input waveguide; and modulating the input light according to a modulation function to have a second power equal to the product of the first power and the modulation function, the modulation function being independent of the polarisation of the input light, wherein the photonic integrated circuit includes: the input waveguide; a polarisation splitter, connected to the input waveguide, and configured to provide, at a first output, light in a first polarisation mode of the two polarisation modes and, at a second output, light in a second polarisation mode of the two polarisation modes; a first polarisation rotator, connected to the first output of the polarisation splitter, and configured to rotate light received therefrom from the first polarisation mode to the second polarisation mode; an optoelectronic modulator, having a first modulation waveguide connected to the first polarisation rotator and a second modulation waveguide connected to the second output of the polarisation splitter, and configured to modulate light in each waveguide according to a modulation scheme; a first intermediate waveguide and a second intermediate waveguide, connected respectively to the first modulation waveguide and the second modulation waveguide; and a polarisation combiner, connected to the first intermediate waveguide and the second intermediate waveguide, and configured to combine light received from each and provide the combined light to an output of the photonic integrated circuit as a modulated signal, wherein one of the first intermediate waveguide and the second intermediate waveguide includes a second polarisation rotator configured to rotate light received therein from one of the first and second polarisation modes to the other of the first and second polarisation modes.

The first intermediate waveguide may comprise the second polarisation rotator, and the second polarisation rotator may be configured to rotate light received therein from the second polarisation mode to the first polarisation mode. Alternatively the second intermediate waveguide may comprise the second polarisation rotator, and the second polarisation rotator may be configured to rotate light received therein from the first polarisation mode to the second polarisation mode.

The first polarisation mode and the second polarisation mode are independent polarisation modes. The two independent polarisation modes may include a transverse electric polarisation mode and a transverse magnetic polarisation mode.

The first polarisation mode may be a transverse electric mode, and the second polarisation mode may be a transverse magnetic mode. Alternatively, the first polarisation mode may be a transverse magnetic mode and the second polarisation mode may be a transverse electric mode. The output of the photonic integrated circuit may be an output waveguide.

The optical path between the output of the modulator and the polarisation combiner may be such that light which exits the modulator from each of two outputs, and is subsequently recombined by the combiner, experiences substantially the same group delay.

The optoelectronic modulator in the circuit of the first aspect may be the optoelectronic modulator of the second aspect as discussed below, and may have any of the optional features as set out therein.

Either or both of the polarisation splitter and the polarisation coupler may be provided as one or more multi-mode interference couplers.

Either or both of the first polarisation rotator and the second polarisation rotator may be provided as a rib waveguide, the rib waveguide including:
 a slab portion; and
 a ridge portion, which is disposed along a surface of the slab portion;
wherein:
 the slab portion has a first slab region whose width, as measured in a direction perpendicular to a guiding direction of the waveguide, increases from a first slab width to a second slab width along a first length, and
 the ridge portion has a first ridge region whose width, as measured in the same direction as the slab widths, decreases from a first ridge width to a second ridge width along the same first length;
 such that the rotator is configured to rotate the polarisation of light during its transmission through the rib waveguide.

The polarisation rotator may have a length along the guiding direction of the waveguide of no less than 400 µm and no more than 950 µm.

The rib waveguide may have a height, as measured from a lower surface of the slab to an upper surface of the ridge, of no less than 0.5 µm and no more than 1.5 µm. This height may represent the height of the slab plus the ridge portion.

More than 50% of the rotation may occur as light passes along the first length.

The slab may include a second slab region whose width remains constant along a second length. A guiding direction of the first slab region may be substantially aligned with a guiding direction of the second slab region.

The first slab width may be no less than 0.5 µm and no more than 2 µm. The second slab width may be no less than 1 µm and no more than 2 µm.

The ridge may include a second ridge region whose width remains constant along a second length. A guiding direction of the first ridge region may be at an angle greater than 0° with a guiding direction of the second ridge region. The second length may be no less than 100 µm and no more than 150 µm and/or the first length may be no less than 300 µm and no more than 800 µm.

The polarisation rotator may be operable at a wavelength of no less than 1.1 µm and no more than 1.7 µm.

The polarisation rotator may further include an input waveguide, connecting an input port of the polarisation rotator to input ports of the first ridge region and first slab region, and whose width tapers inwards in a direction from the input port of the rotator to the input ports of the first ridge region and first slab region.

The polarisation rotator may further include an output waveguide, connecting output ports of the second ridge region and second slab region to an output port of the polarisation rotator, and whose width broadens outwards in a direction from the output ports of the second ridge region and the second slab region to the output port of the polarisation rotator.

The polarisation splitter and first polarisation rotator may be provided as a single polarisation diverse grating coupler. The second polarisation rotator and polarisation coupler may be provided as a single diverse grating coupler.

The circuit may be referred to as a passive polarisation diverse modulator circuit.

The circuit may be present on a single silicon chip, and may include on an edge region the input waveguide and the output waveguide, each connectable to a fibre optic cable.

In a second aspect, there is provided an optoelectronic modulator comprising:
 a first waveguide, including a first modulation region;
 a second waveguide, including a second modulation region; and
 a driver, operable to modulate light in both the first waveguide and the second waveguide, and wherein the driver is configured to send the same modulation signal to each of the first modulation region and the second modulation region.

As such, light traversing the first and second waveguides can be modulated using the same modulation scheme.

Optional features of the invention will now be set out. These are applicable singly or in any combination with any aspect of the invention.

The first modulation region and the second modulation region may each comprise a first doped region and a second doped region. The first doped region and the second doped region may be separated via an intrinsic region or may, alternatively, directly abut one another. The first modulation region and the second modulation region may share a shared electrode, and the shared electrode may be driven by the driver.

The second doped region of each modulation region may be contiguous with the other, and a shared electrode may be connected to the second doped regions of the modulation regions. Said another way, the second doped region of each modulation region may in effect be a single doped region shared between each modulation region. In examples where the waveguides are ridge waveguides, the second doped region may take a 'U' shape as viewed in a direction parallel to a guiding direction of the waveguides. The doped regions may extend only part way up a sidewall of the respective waveguides. The doped regions may extend entirely up the sidewall of the respective waveguides. In some examples, the doped regions of each modulation region are set horizontally across from one another, i.e. in a plane parallel to a substrate of the modulator. Alternatively, the doped regions of each modulation region may be set vertically across from one another, i.e. in a plane perpendicular to a substrate of the modulator. For example, there may be an upper doped region positioned in a region of each modulation region furthest from a substrate of the modulator, and a lower doped region positioned closer to the substrate than the upper doped region. An intrinsic region may be located between the upper doped region and the lower doped region.

The first doped region of the first modulation region may be connected to a first electrode and the first doped region of the second modulation region may be connected to a second electrode. Each of these electrodes may be driven by the same signal from the driver, but be physically distinct electrodes. Alternatively, the first doped region of each modulation region may be connected to a second shared electrode of the plurality of electrodes. In this example, the electrode may extend from the first doped region of the first modulation region to the first doped region of the second modulation region.

Each waveguide may be a ridge waveguide. The optical mode of each waveguide may be substantially contained to a region of the waveguide projecting up from a base of each waveguide. Alternatively, each waveguide may be rib waveguide, wherein the optical mode of each waveguide is substantially contained with a base of each waveguide and guided by a rib of each waveguide.

The waveguides may be formed of silicon. Alternatively, the waveguides may be formed of silicon germanium or silicon germanium tin, or III-V compounds, for example: a layer stack of InGaAsP or InGaAlAs on InP substrate hybridly integrated in the Si platform.

The electrodes may be formed of aluminium. Alternatively, the electrodes may be formed of titanium, titanium nitride, or gold.

The first waveguide and the second waveguide may be counter-propagating waveguides. By counter-propagating, it may be meant that the waveguides are configured to guide light in antiparallel directions relative to one another. Alternatively, the first waveguide and the second waveguide may be co-propagating waveguides. By co-propagating, it may be meant that the waveguide are configured to guide light in parallel directions relative to one another.

In a third aspect, there is provided a method of modulating light in a photonic integrated circuit, comprising the steps of:
providing light from an input waveguide, said light being in a superposition of two polarisation modes of the waveguide;
splitting the light into a first portion having a first polarisation mode of the two polarisation modes, and a second portion having a second polarisation mode of the two polarisation modes;
rotating the polarisation of the first portion, such that it has the second polarisation mode;
modulating the first portion and the second portion according to a modulation scheme;
rotating the polarisation of one of the first portion and the second portion, so as to provide one portion having the first polarisation mode and one portion having the second polarisation mode; and
combining the first portion and the second portion.

The photonic integrated circuit as used in the method of the third aspect may be the photonic integrated circuit as discussed in the first aspect, and may have any of the optional features as set out therein.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 1:
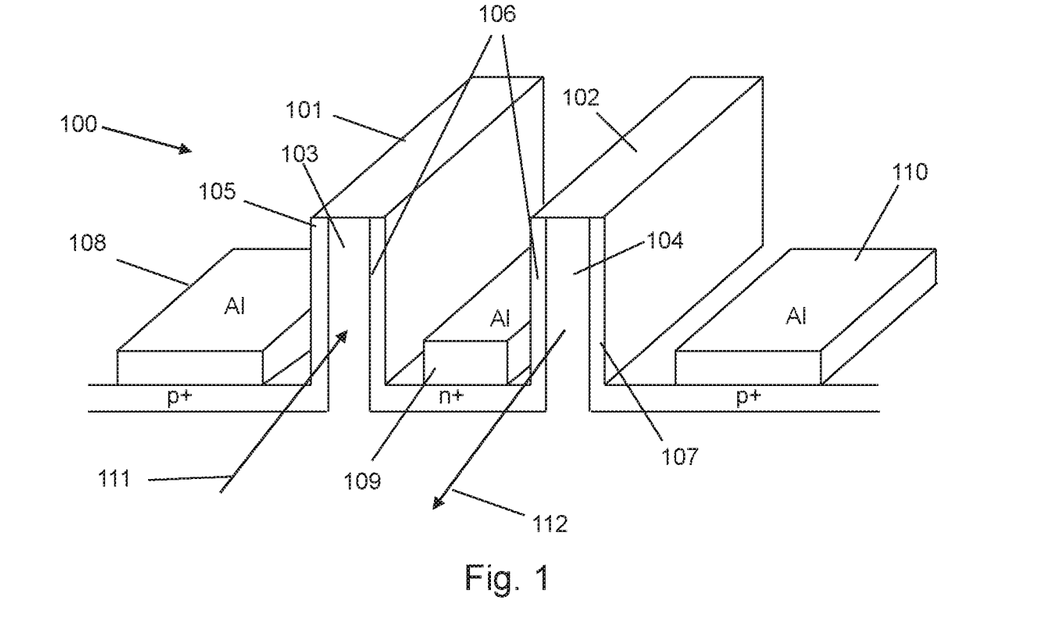
FIG. 1 shows a schematic perspective view of a two waveguide modulator.

Aspects and embodiments of the present invention will now be discussed with reference to the accompanying figures. Further aspects and embodiments will be apparent to those skilled in the art. All documents mentioned in this text are incorporated herein by reference FIG. 1 shows a schematic perspective view of a two waveguide modulator 100. Broadly, the modulator comprises a first waveguide 101 and a second waveguide 102. In this example they are both ridge waveguides, and so extend away from a base. The first waveguide 101 includes an intrinsic region 103, which is located between two doped sidewalls 105 and 106. Similarly, the second waveguide 102 includes an intrinsic region 104 which is also located between two doped sidewalls 107 and 106. In this example, the doped region of the sidewalls extends up the entire height of the sidewall. In other examples, the doped region may extend only part way up the sidewall.

Figure 3:
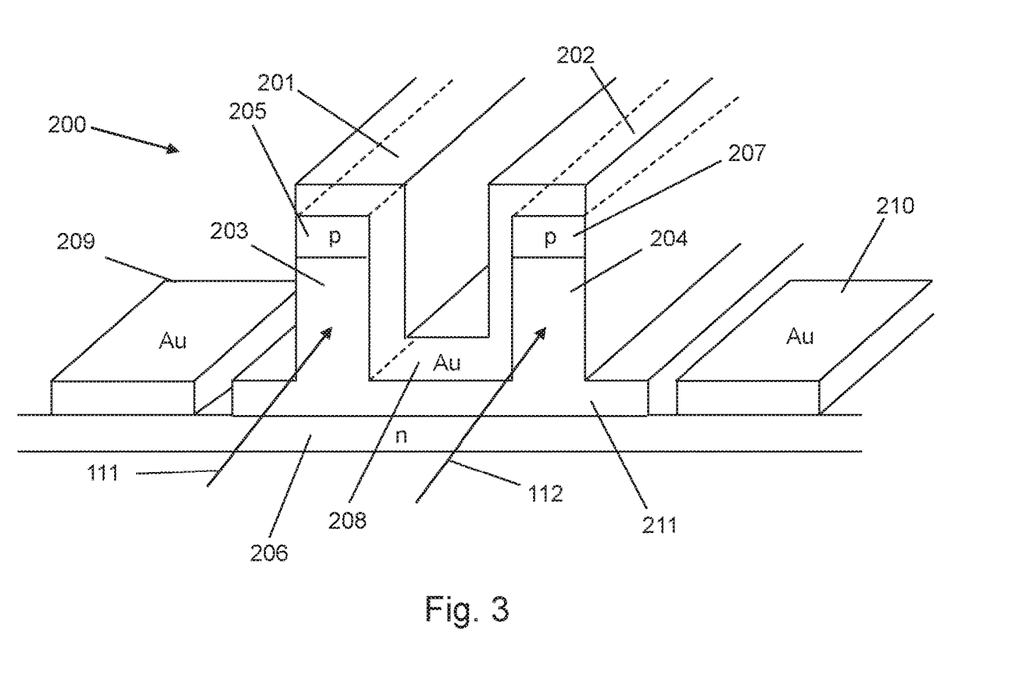
FIG. 3 shows a schematic view of a variant two waveguide modulator.

In the first waveguide, the doped sidewalls are provided by a first doped region 105 (in this example heavily doped with a p-type dopant) and a second doped region 106 (in this example heavily doped with an n-type dopant). The doped regions extend along the base and then up respective sidewalls, thereby bordering the intrinsic region 103. The optical mode of the first waveguide 101 is generally contained in the intrinsic region 103. Whilst, in this example, the doped regions are present on the vertical sidewalls of the waveguide, it is possible (as discussed above) to instead have doped regions extend horizontally along an uppermost and lowermost surface of the ridge waveguide. This is shown in FIG. 3.

In the second waveguide, the doped sidewalls are provided by a third doped region 107 (in this example heavily doped with a p-type dopant) and the same second doped region 106 as the first waveguide. This second doped region 106 extends horizontally along the base before extending up a sidewall of each of waveguides 101 and 102. The third doped region 107 also extends up a sidewall of waveguide 102, and therefore third doped region 107 and second doped region 106 border the intrinsic region 104. The optical mode of the second waveguide 102 is generally contained in the intrinsic region 103. Again, the doped regions may instead extend horizontally along an uppermost and lowermost surface of the ridge waveguide.

Whilst, in the examples shown, an intrinsic region 103 and 104 is present in each waveguide (and so forms a PIN junction), in some other examples the second doped region 106 may directly abut the first doped region 105 and similarly may directly abut the third doped region 107, thereby forming a pair of PN junctions.

The first doped region 105 is electrically connected to a first electrode 108, which in this example is formed of aluminium. The second doped region 106 is connected to a second electrode 109, and the third doped region 107 is connected to a third electrode 110. In some examples the third electrode 110 and first electrode 108 are in fact the same electrode, which extends from the first doped region to the third doped region.

All electrodes are connected to the same driver, and therefore, in use, light present in both waveguides undergoes the same modulation.

In the example shown, the waveguides are operated to propagate light 111 and 112 respectively in opposite directions. Conversely, it is possible that both waveguides would be operated to propagate light in the same direction.

Figure 2:
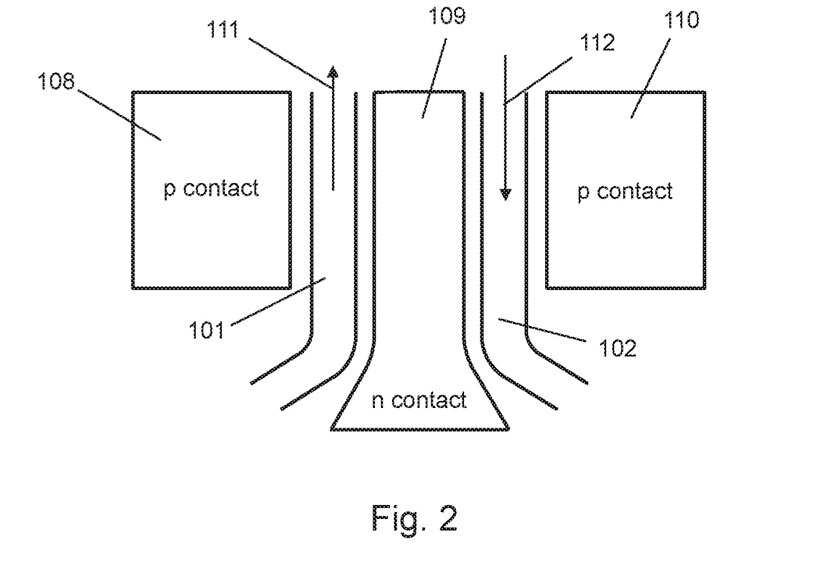
FIG. 2 shows a top-down schematic view of the two waveguide modulator of FIG. 1.

FIG. 2 is a top-down view of the modulator 100 of FIG. 1.

FIG. 3 shows a schematic view of a variant two-waveguide modulator 200. Broadly, the modulator comprises a first waveguide 201 and a second waveguide 202. In this example, they are both ridge waveguides, and so extend away from a base 211. The first waveguide 201 includes an intrinsic region 203, which is located between two doped regions: an upper doped region 205 and a lower doped region 206. Similarly, the second waveguide 202 includes an intrinsic region 204, which is located between two doped regions: an upper doped region 207 and a lower doped region 206. In this example, the upper doped regions extend across the entire width of each waveguide. In other examples, the upper doped regions may extend only part way across the width of each waveguide.

The lower doped region 206 of each waveguide is a single, contiguous region, which extends horizontally below each of the waveguides.

Whilst in the examples shown, an intrinsic regions 203 and 204 is present in each waveguide (and so forms a PIN junction), in some other examples the lower doped region 206 may directly abut the upper doped regions 205 and 207, thereby forming a pair of PN junctions.

The upper doped regions 205 and 207 are electrically connected to a first electrode 208, which in this example is formed from aluminium. The lower doped region 106 is connected to a second electrode 209 and a third electrode 210. The second and third electrodes are on opposing sides, i.e. separated by the waveguides 201 and 202. In some examples, not shown, the device may have only a first electrode 208 and a second electrode 209. As the lower doped region 106 extends below both of the waveguides, only a single electrode is needed for it.

All electrodes are connected to the same driver, and therefore, in use, light present in both waveguides undergoes the same modulation.

In the example shown, the waveguides are operated to propagate light 111 and 112 respectively in the same direction. Conversely, it is possible that both waveguides would be operated to propagate light in opposite directions.

Figure 4:
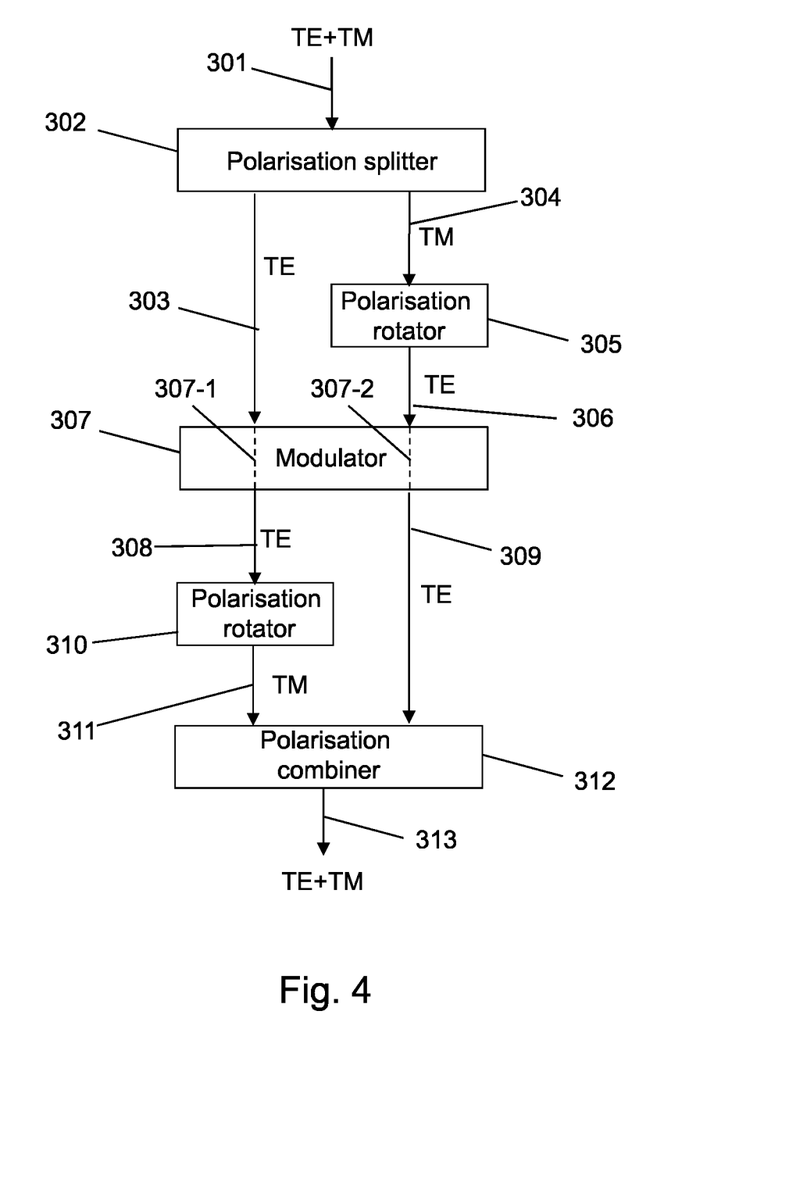
FIG. 4 shows a schematic of a passive polarisation diverse photonic integrated circuit.

FIG. 4 shows a schematic of a passive polarisation diverse photonic integrated circuit. Broadly, the circuit comprises an input waveguide 301 which provides light into a polarisation splitter 302. The light provided contains both transverse electric (TE) and transverse magnetic (TM) components. The amount of TE light as compared to TM light may vary in time, and is not necessarily split 50/50. The polarisation splitter 302 separates the received light into a portion containing essentially only TE light, and a portion containing essentially only TM light. The TM portion is provided into intermediate waveguide 304, and then on to polarisation rotator 305. The polarisation rotator 305 rotates the polarisation of the received TM portion such that it is now in a TE mode. This TE portion is then provided to a further intermediate waveguide 306, which connects to modulator 307. Whereas, the TE containing portion provided from splitter 302 is directed via intermediate waveguide 303 directly into the modulator 307.

The modulator 307 is, in this example, the optoelectronic modulator 100 or 200 as shown in either of FIGS. 1 and 3. The modulator 307 includes a first modulation waveguide 307-1 and a second modulation waveguide 307-2. The first modulation waveguide 307-1 may receive light from the intermediate waveguide 303, and the second modulation waveguide 307-2 may receive light from the intermediate waveguide 306. In some embodiments, the first and second modulation waveguides 307-1 and 307-2 may respectively correspond to the first and second waveguides 101 and 102 of the optoelectronic modulator 100 in FIG. 1. In some embodiments, the first and second modulation waveguides 307-1 and 307-2 may respectively correspond to the first and second waveguides 201 and 202 of the optoelectronic modulator 200 of FIG. 3. The modulator then modulates the received light according to a modulation scheme. Importantly, the light which is being modulated in each waveguide is of the same mode, in this example both TE (conversely, they could both be in a TM mode). Therefore, any polarisation-based variability in the modulated is negated. Notably, the light should be provided to the modulator in a polarisation mode which will result in the most efficient modulation. For example, of the modulator modulated most TE light more efficiently than TM light, the light should be provided to the modulator in the TE polarisation mode, or vice versa.

After modulation, the light received from intermediate waveguide 306 is provide into a further intermediate waveguide 309 which directly connects to a polarisation combiner 312. In contrast, the light received from intermediate waveguide 303 is provided to intermediate waveguide 308 which connects to a second polarisation rotator 310. This second polarisation rotator operates in a similar manner to the first, in that it will rotate received light from one mode to another e.g. from TE to TM. The rotated light is then provided to a further intermediate waveguide 311 which is connected to polarisation comber 312.

The polarisation comber 312 then combines the light received from intermediate waveguide 309 and 311 and provides a combined output signal, which has been modulated by the modulation scheme, at output waveguide 313.

Whilst, in this example, waveguide 304 receives TM mode light and waveguide 303 receives TE light, the skilled person will of course appreciate that the inverse is also possible. Further, whilst in this example the polarisation rotator 310 is provided between waveguides 308 and 311, the skilled person will appreciate that it could instead be provided between waveguide 309 and polarisation combiner 312. In such examples, the path length of the un-rotated light may need to be adjusted to ensure that the group delay between the initially TE containing light and initially TM containing light remains substantially matched from the output of the modulator onwards.

Figure 5:
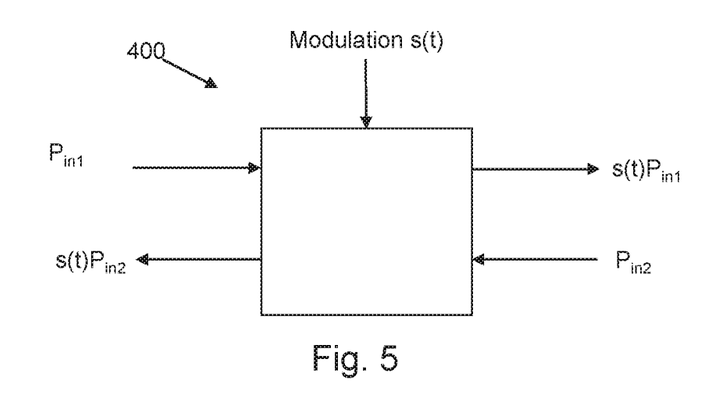
FIG. 5 shows a modulation schema for a two waveguide modulator having counter-propagating waveguides.

FIG. 5 shows a modulation schema for a two waveguide modulator 400 having counter-propagating waveguides. Light is provided into the modulator 400 via two ports, one on each side of the modulator. The first having power $P_{in1}$ and the second having power $P_{in2}$. A modulation signal $s(t)$ is applied to both, and so a modulated signal is provided out of two ports again one on each side of the modulator. The first modulated signal has power $s(t) \cdot P_{in1}$ and the second modulated signal has power $s(t) \cdot P_{in2}$.

Figure 6:
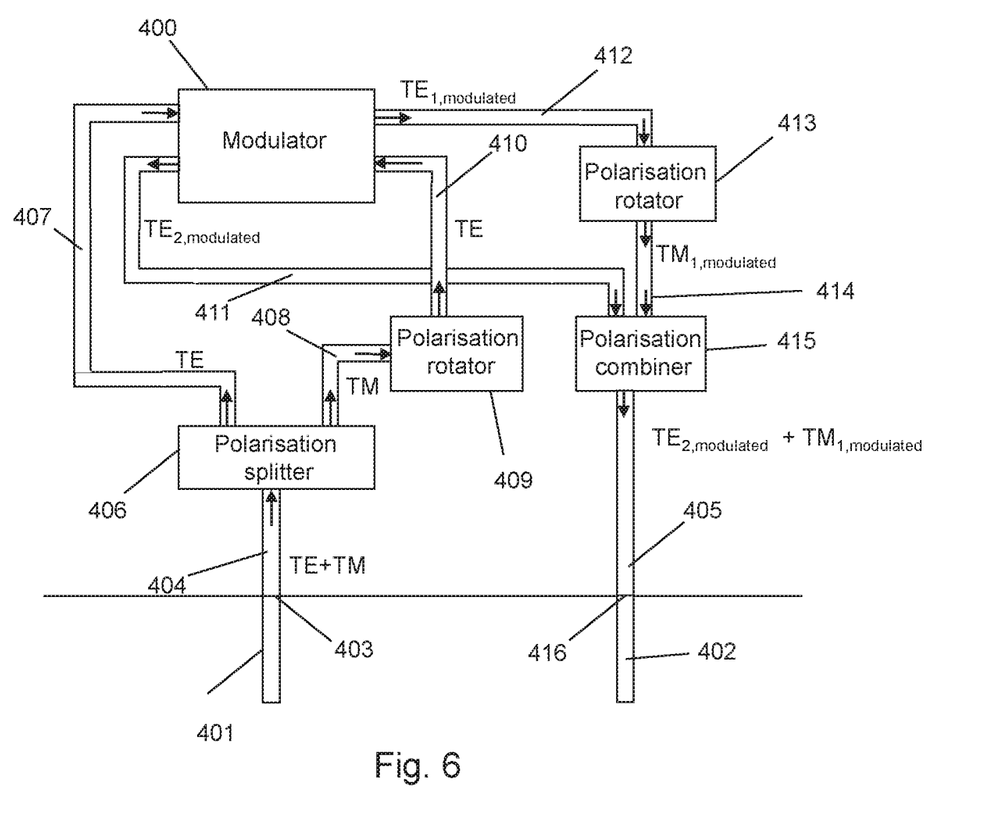
FIG. 6 shows a chip-layout for a photonic integrated circuit implementing the modulation schema of FIG. 5.

FIG. 6 shows a chip-layout for a photonic integrated circuit implementing the modulation scheme shown in FIG.

5. In this example, the modulator that has a good modulation efficiency for the TE polarisation mode and a poor modulation efficiency for the TM polarisation mode. Input fibre 401 is connected, at input facet 403 to an input waveguide 404. Input fibre 401 provides, in use, light having a mixed polarisation state i.e. components with both TE and TM polarisations to the input waveguide 404. The input waveguide 404 connects to polarisation splitter 406, which operates to divide the light into a TE-only containing portion and a TM-only containing portion. The TE-only portion is provided to intermediate waveguide 407, which connects the polarisation splitter 406 to modulator 400. Whereas, the TM-only portion is provided, via intermediate waveguide 408, to polarisation rotator 409. The polarisation rotator 409 operates to rotate the polarisation of light received therein from TE to TM or vice versa. In this example, the polarisation rotator receives light having a TM polarisation and therefore rotates it to have, instead, a TE polarisation. This rotated TE polarised light is then provided, via intermediate waveguide 410, to modulator 400 (which is an example of the modulator shown in FIG. 1). Of note is that waveguide 410 connects to the modulator 400 on an opposing side of the modulator to which waveguide 407 connects.

As the modulator 400 in this example has counter-propagating waveguides, intermediate waveguide 410 connects to the modulator on an opposing side of the modulator to the side to which intermediate waveguide 407 connects. The modulator, having received light from waveguides 410 and 407, modulates this light according to the modulation scheme.

The light received from waveguide 407, now modulated and so referred to as $TE_{1,modulated}$, exits the modulator 400 via waveguide 412. Similarly, the light received from waveguide 410, now modulated and so referred to as $TE_{2,modulated}$, exists the modulator 400 via waveguide 411. Due to the counter-propagating waveguides of modulator 400, waveguide 411 carrying one of the outputs of modulator 400 crosses waveguide 410 carrying one of the inputs.

Signal $TE_{1,modulated}$ is provided, via waveguide 412, to a second polarisation rotator 413. The second polarisation rotator, like the first, operates to rotate the polarisation of light received from TE to TM or vice versa. In this example, the polarisation rotator receives TE polarised light and so rotates it to have a TM polarisation. The rotated signal, now referred to as $TM_{1,modulated}$, is provided via waveguide 414 to polarisation combiner 415.

In contrast the signal $TE_{2,modulated}$ is provided via waveguide 411 to the polarisation combiner without, in this example, having been rotated. The polarisation combiner therefore receives two input signals: $TE_{2,modulated}$ and $TM_{1,modulated}$. It provides, at an output, a signal formed by the combination of these two input signals: $TE_{2,modulated}$+$TM_{1,modulated}$. The output signal is provided to output waveguide 405, which connects to an output fibre 402 at facet 416.

Figure 7:
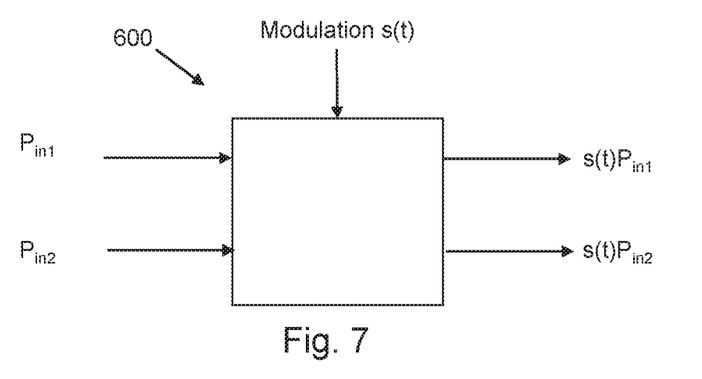
FIG. 7 shows a modulation schema for a two waveguide modulating having co-propagating waveguides.

FIG. 7 shows a modulation schema for a two waveguide modulator 600 having co-propagating waveguides. Light is provided into the modulator 600 via two ports, both on one side of the modulator. The first having power $P_{in1}$ and the second having power $P_{in2}$. A modulation signal s(t) is applied to both, and so a modulated signal is provided out of two ports again both on one side of the modulator. The first modulated signal has power $s(t) \cdot P_{in1}$, and the second modulated signal has power $s(t) \cdot P_{in2}$.

Figure 8:
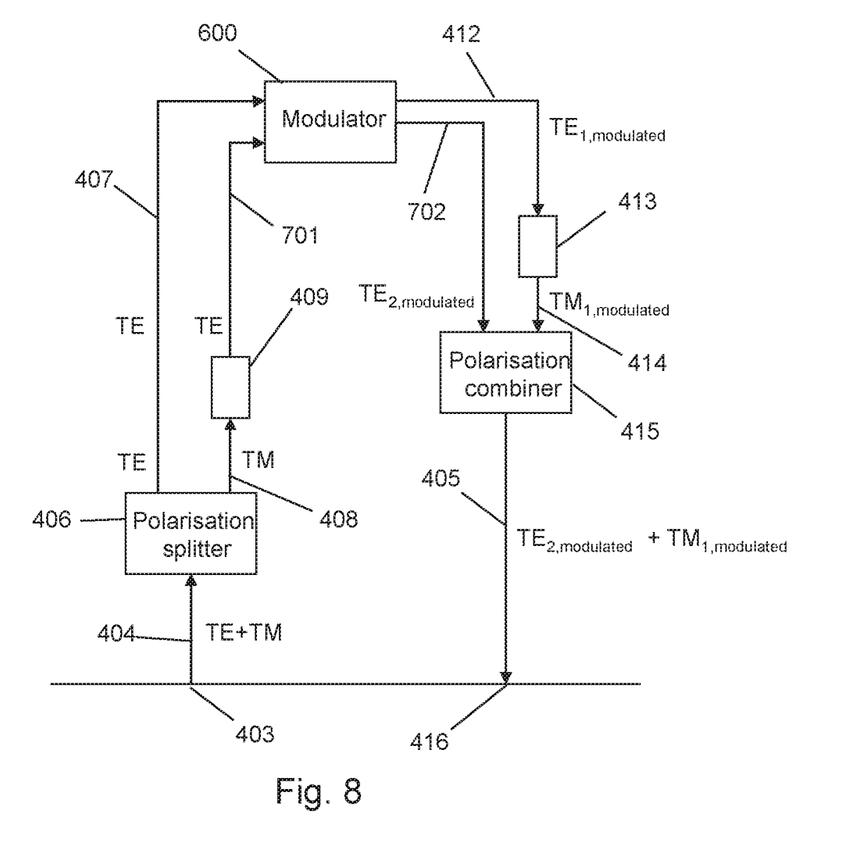
FIG. 8 shows a chip-layout for a photonic integrated circuit implementing the modulation schema of FIG. 7.

FIG. 8 shows a chip-layout for a photonic integrated circuit implementing the modulation scheme shown in FIG. 7. It shares a number of features with the circuit shown in FIG. 6, and so like features are indicated by like reference numerals.

In contrast to the circuit shown in FIG. 6 waveguide 701, carrying the output of polarisation rotator 409, connects to the modulator 600 on a same side as waveguide 407. Modulator 600 in FIG. 6 is the modulator 200 shown in FIG. 3. Further, waveguide 702 carrying the modulated output $TE_{2,modulated}$ does not cross waveguide 701.

Figure 9:
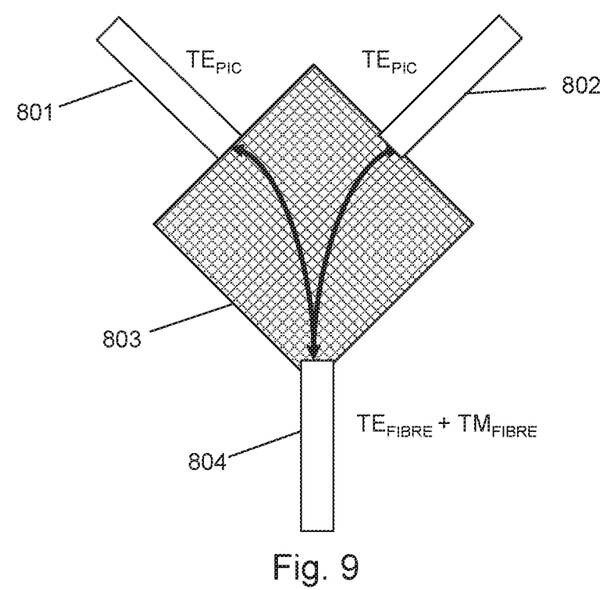
FIG. 9 shows a top-down schematic view of a polarisation diverse grating coupler.

FIG. 9 shows a top-down schematic view of a polarisation diverse grating coupler known per se to the skilled person (see, for example, 2009 Van Laere et al., Journal of Lightwave Technology, Vol. 27, Issue 5, Pages 612-618). Waveguides (or equally fibre cables) 801 and 802 provide light into grating 803. In this example, waveguide 801 provides light having a transverse-electric (relative to the photonic integrated circuit) signal $TE_{PIC}$, whereas waveguide 802 provides light having a transverse-electric (relative to the photonic integrated circuit) signal $TE_{PIC}$.

The light is propagated through grating 803 to output fibre 804. The grating is configured such that light passing through couples and therefore output fibre 804 receives light which is a combination of the two received signals. This output signal is referred to as $TE_{FIBRE}$+$TM_{FIBRE}$, in that, relative to the fibre, it contains both transverse-magnetic and transverse-electric components.

Conversely, it is possible for fibre 804 to provide light into the grating having $TE_{FIBRE}$ and $TM_{FIBRE}$ polarisation components. The grating then converts both polarisations in this received light into light having only a $TE_{PIC}$ polarisation component in one of the two waveguides 801 and 802.

Figure 10:
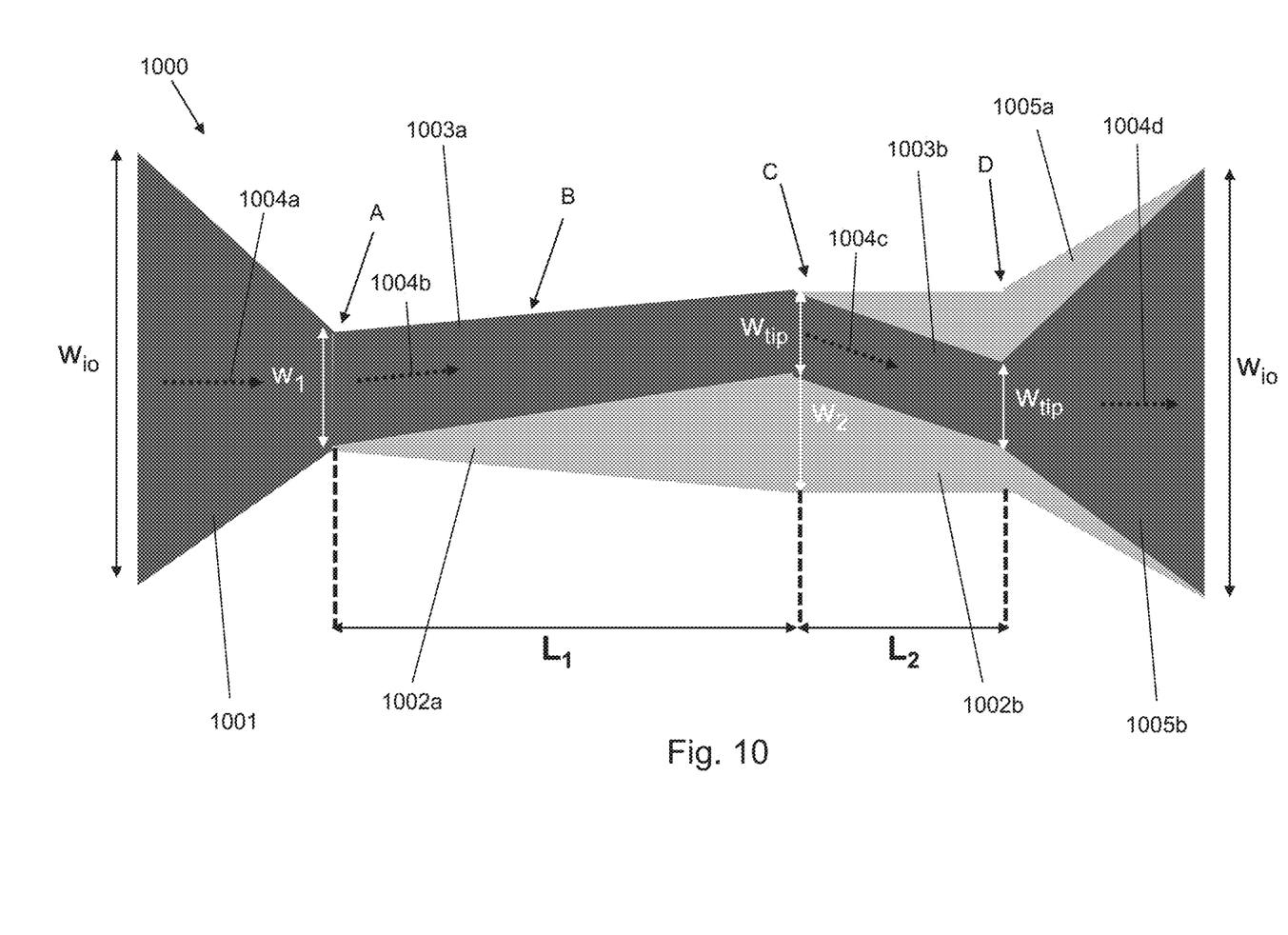
FIG. 10 shows a top-down view of a polarisation rotator.

FIG. 10 shows a top-down view of an example of a polarisation rotator 1000, suitable for use in the circuits shown in FIGS. 4, 6, and 8. As can be seen, the input waveguide 1001 has a first width $w_{io}$ which decreases to a second width $w_1$ where the input waveguide connects to the rib waveguide. The input waveguide has a guiding direction 1004a, which is generally aligned with the guiding direction 1004d of the output waveguide. Of note, is that the guiding direction of the slab portion 1002 is generally aligned with the guiding direction of the input and output waveguides, i.e. 1004a and 1004d. Whereas, guiding directions 1004b and 1004c of the ridge portion 1003 are not aligned with the guiding direction 1004a and 1004d of the input and output waveguides.

As discussed previously, the rib waveguide comprises a ridge portion and a slab portion. Each of these can be conceptually divided into first and second portions. Taking the slab portion first, it has a first slab portion 1002a and a second slab portion 1002b connected to one another. The width of the slab portion increases from $w_1$, where the first slab portion connects to the input waveguide, to $w_2$ where the first slab portion 1002a connects to the second slab portion 1002b over the length $L_1$. The width of the second slab portion is substantially constant over the length $L_2$ as shown.

In contrast, a first ridge portion 1003a decreases in width from $w_1$, where the first ridge portion connects to the input waveguide, to $w_{tip}$ where the first ridge portion 1003a connects to the second ridge portion 1003b. The width of the second ridge portion is substantially constant, and the second ridge portion links the first ridge portion to the output waveguide. The output waveguide 1005 can also be considered to have a slab portion 1005a and a ridge portion 1005b whose widths respectively increase from $w_2$ and $w_{tip}$ to $w_{io}$. The input waveguide 1001 and output waveguide 1005 in this example have a length of around 80 μm. The second ridge portion 1003b brings the ridge to the centre of the output waveguide 1005. The distance from the input waveguide—slab interface to the slab—output waveguide interface, i.e. the length of the slab region or $L_1+L_2$, may be at least 520 μm and no more than 820 μm. The input and output waveguides may have a length of around 80 μm.

As was discussed previously, the majority of the rotation occurs along $L_1$ i.e. in the first ridge portion and first slab portion. Advantageously, this means that the design is robust against variations in the tip width ($w_{tip}$).

In one example of the rotator discussed above, t=1 μm, $t_{slab}$=0.55 μm, $w_1$=0.75 μm, $w_{tip}$=0.5 μm, $w_2$=1.3 μm, $L_1$ takes a value of at least 400 μm and no more than 700 μm, and $L_2$=120 μm. Such a device displays a polarisation extinction ratio, defined in this example as the (TM→TE transmission)/(TM→TM transmission) of greater than 13 dB. The device also has a conversion efficiency, defined as the TM→TE transmission of greater than −0.2 dB, where the variation in $w_{tip}$ is within the range 0.2 μm-0.6 μm.

Figure 11:
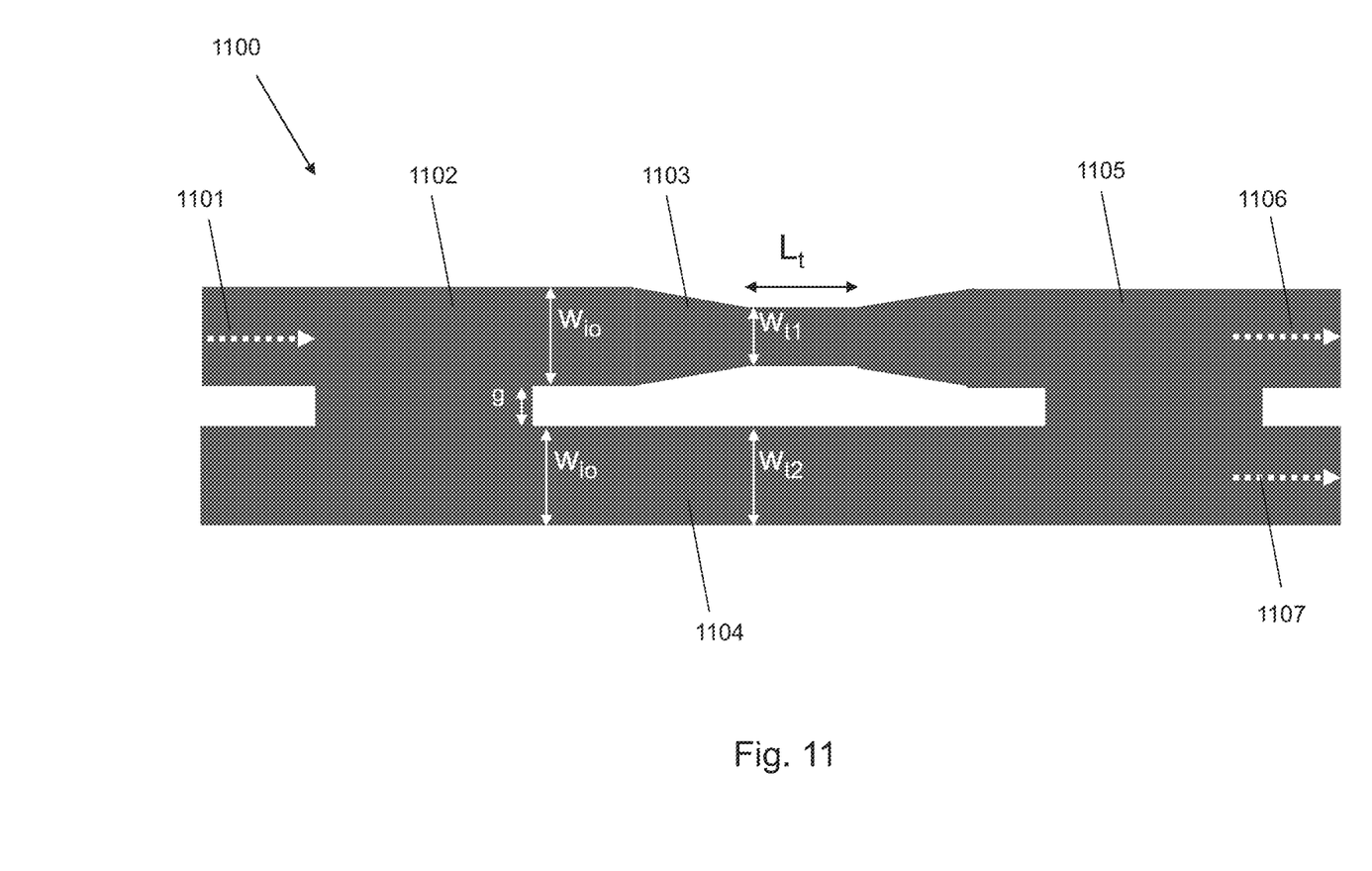
FIG. 11 shows an example of a polarisation splitter/combiner.

FIG. 11 shows one example of a polarisation splitter/combiner 1100 which may be incorporated into the photonic integrated circuits shown in FIGS. 4, 6, and 8 as the polarisation splitter and/or polarisation combiner. Broadly, the polarisation splitter can be considered as a Mach-Zehnder interferometer, where the phase difference between the respective arms 703 and 704 should satisfy the equation:

$$\Delta\phi_{TE}=(\beta_{TE}(w_{t1})-\beta_{TE}(w_{t2}))\cdot L_t=m_1\pi$$

$$\Delta\phi_{TM}=(\beta_{TM}(w_{t1})-\beta_{TM}(w_{t2}))\cdot L_t=m_2\pi$$

Where $\beta_{TE}$ and $\beta_{TM}$ are the propagation constants of the TE and TM polarisation states, respectively, $m_1$ and $m_2$ are integers, and $m_1+m_2$ is odd. For a 1 μm-thick strip silicon waveguide, $m_1$=3 and $m_2$=2 is the solution with the smallest integers, which leads to the smallest value for $L_t$ which minimises the device footprint.

In more detail, the polarisation splitter 1100 is formed of an input waveguide 1101 which receives light with components in both TE and TM polarisation states. The light passes through a first multimode interference coupler 1102 (in this instance functioning as a splitter), and provide to first intermediate waveguide 1103 and second intermediate waveguide 1104. The first intermediate waveguide tapers from a first width $w_{io}$ to a second width $w_{t1}$ and extends along a length $L_t$ with the width $w_{t1}$. After this length, the width of the first intermediate waveguide then increases from $w_{t1}$ back to $w_{io}$ before connecting to a second multimode interference coupler 1105. In some examples, the second intermediate waveguide 1104 has a width $w_{io}$ which remains constant, and the second intermediate waveguide couples an output of the splitter 1102 to an input of the coupler 1105. In other examples, the second intermediate waveguide has a first width $w_{io}$ which may taper to a second width $w_{t2}$. A gap g between the first intermediate waveguide and the second intermediate waveguide may be around 1.5 μm.

By applying the conditions above, namely the required phase difference, the splitter 1100 can be configured such that light entering the device is preferentially divided into TE and TM polarized components which are provided to distinct outputs 1106 and 1107 of the second multimode interference coupler 1105. It should be noted that the first multimode interference coupler includes, in this example, a second input waveguide. However in general it is not used when operating as a polarisation splitter.

In some examples, the taper widths i.e. $w_{t1}$ and $w_{t2}$ lie in the range 1 μm<$w_{ti}$<4 μm such that mode hybridization is avoided.

Whilst the example discussed above is operating as polarisation splitter (i.e. dividing input light into two portions, each having a respective polarisation component), it will of course be appreciated that the device may operate as a polarisation combiner. In such examples both the first input waveguide and the second input waveguide would, respectively, receive light having a polarisation mode. The coupler 1105, combined with waveguides 1104 and 1104, would operate to combine the respectively received signals. A single light signal, comprising the two received signals, would be outputted from either or both of outputs 1106 and 1107.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

What is claimed is:

1. A photonic integrated circuit, comprising:
   an input waveguide configured to guide input light in a superposition of two polarisation modes of the input waveguide;
   a polarisation splitter, connected to the input waveguide, and configured to provide, at a first output, light in a first polarisation mode of the two polarisation modes and, at a second output, light in a second polarisation mode of the two polarisation modes;
   a first polarisation rotator, connected to the first output of the polarisation splitter, and configured to rotate light received therefrom from the first polarisation mode to the second polarisation mode;
   an optoelectronic modulator, having a first modulation waveguide connected to the first polarisation rotator and a second modulation waveguide connected to the second output of the polarisation splitter, and configured, when the input light comprises both of the first and second polarisation modes, to modulate light in each waveguide according to the same modulation scheme, such that:
      the power of light output from the first modulation waveguide is equal to the product of the power of light input to the first modulation waveguide and a modulation signal, and
      the power of light output from the second modulation waveguide is equal to the product of the power of light input to the second modulation waveguide and the same modulation signal;
   a first intermediate waveguide and a second intermediate waveguide, connected respectively to the first modulation waveguide and the second modulation waveguide; and
   a polarisation combiner, connected to the first intermediate waveguide and the second intermediate waveguide, and configured to combine light received from each and provide the combined light to an output of the photonic integrated circuit as a modulated signal,
   wherein one of the first intermediate waveguide and the second intermediate waveguide comprises a second polarisation rotator configured to rotate light received therein from one of the first and second polarisation modes to the other of the first and second polarisation modes.

2. The photonic integrated circuit of claim 1, wherein the first intermediate waveguide comprises the second polarisation rotator, and the second polarisation rotator is configured to rotate light received therein from the second polarisation mode to the first polarisation mode.

3. The photonic integrated circuit of claim 1, wherein the second intermediate waveguide comprises the second polarisation rotator, and the second polarisation rotator is configured to rotate light received therein from the first polarisation mode to the second polarisation mode.

4. The photonic integrated circuit of claim 1, wherein the optoelectronic modulator comprises:
the first modulation waveguide, including a first modulation region;
the second modulation waveguide, including a second modulation region; and
a driver, operable to modulate light in both the first modulation waveguide and the second modulation waveguide,
wherein the driver is configured to send the same modulation signal to each of the first modulation region and the second modulation region.

5. The photonic integrated circuit of claim 1, wherein either or both of the polarisation splitter and the polarisation combiner are provided as one or more multi-mode interference couplers.

6. The photonic integrated circuit of claim 1, wherein either or both of the first polarisation rotator and the second polarisation rotator is provided as a rib waveguide, the rib waveguide including:
a slab portion; and
a ridge portion, which is disposed along a surface of the slab portion, and wherein:
the slab portion has a first slab region whose width, as measured in a direction perpendicular to a guiding direction of the waveguide, increases from a first slab width to a second slab width along a first length;
the ridge portion has a first ridge region whose width, as measured in the same direction as the slab widths, decreases from a first ridge width to a second ridge width along the same first length; and
such that the rotator is configured to rotate the polarisation of light during its transmission through the rib waveguide.

7. The photonic integrated circuit of claim 1, wherein the polarisation splitter and first polarisation rotator, and/or the second polarisation rotator and polarisation combiner, are each provided as a single polarisation diverse grating coupler.

8. The photonic integrated circuit of claim 1, wherein the circuit is a passive polarisation diverse modulator circuit.

9. The photonic integrated circuit of claim 1, wherein the optoelectronic modulator comprises:
the first modulation waveguide, including a first modulation region;
the second modulation waveguide, including a second modulation region; and
a driver, operable to modulate light in both the first modulation waveguide and the second modulation waveguide,
wherein the driver is configured to send the same modulation signal to each of the first modulation region and the second modulation region.

10. The photonic integrated circuit of claim 9, wherein the first modulation region and the second modulation region each comprises a first doped region and a second doped region.

11. The photonic integrated circuit of claim 10, wherein the second doped region of each modulation region is contiguous with the other, and wherein a shared electrode is connected to the second doped regions of the modulation regions.

12. The photonic integrated circuit of claim 10, wherein the first doped region of the first modulation region is connected to a first electrode and the first doped region of the second modulation region is connected to a second electrode.

13. The photonic integrated circuit of claim 10, wherein the first doped region of each modulation region is connected to a second shared electrode.

14. The photonic integrated circuit of claim 9, wherein each of the first modulation waveguide and the second modulation waveguide is a ridge waveguide.

15. The photonic integrated circuit of claim 9, wherein the first and second modulation waveguides are formed from a III-V stack.

16. The photonic integrated circuit of claim 9, comprising electrodes formed from gold.

17. The photonic integrated circuit of claim 9, wherein the first modulation waveguide and the second modulation waveguide are counter-propagating waveguides.

18. The photonic integrated circuit of claim 9, wherein the first modulation waveguide and the second modulation waveguide are co-propagating waveguides.

19. A method of modulating light in a photonic integrated circuit, comprising the steps of:
providing light from an input waveguide, said light comprising both of two polarisation modes of the input waveguide and being in a superposition of the two polarisation modes;
splitting the light into a first portion having a first polarisation mode of the two polarisation modes, and a second portion having a second polarisation mode of the two polarisation modes;
rotating the polarisation of the first portion, such that it has the second polarisation mode;
modulating the first portion and the second portion according to the same modulation scheme such that:
the power of the first portion after modulation is equal to the product of the power of the first portion before modulation and a modulation signal, and
the power of the second portion after modulation is equal to the product of the power of the second portion before modulation and the same modulation signal;
rotating the polarisation of one of the first portion and the second portion, so as to provide one portion having the first polarisation mode and one portion having the second polarisation mode; and
combining the first portion and the second portion.

20. The method of claim 19, wherein the photonic integrated circuit comprises:
the input waveguide, configured to guide light in a superposition of the two polarisation modes of the input waveguide;
a polarisation splitter, connected to the input waveguide, and configured to provide, at a first output, light in the first polarisation mode and, at a second output, light in the second polarisation mode;

a first polarisation rotator, connected to the first output of the polarisation splitter, and configured to rotate light received therefrom from the first polarisation mode to the second polarisation mode;

an optoelectronic modulator, having a first modulation waveguide connected to the first polarisation rotator and a second modulation waveguide connected to the second output of the polarisation splitter, and configured to modulate light in each waveguide according to a modulation scheme;

a first intermediate waveguide and a second intermediate waveguide, connected respectively to the first modulation waveguide and the second modulation waveguide; and a polarisation combiner, connected to the first intermediate waveguide and the second intermediate waveguide, and configured to combine light received from each and provide the combined light to an output of the photonic integrated circuit as a modulated signal, wherein one of the first intermediate waveguide and the second intermediate waveguide comprises a second polarisation rotator configured to rotate light received therein from one of the first and second polarisation modes to the other of the first and second polarisation modes.

21. A method of modulating light in a photonic integrated circuit, the method comprising the steps of:

providing input light having a first power from an input waveguide, said input light being in a superposition of two polarisation modes of the input waveguide; and modulating the input light according to a modulation function to have a second power equal to the product of the first power and the modulation function, the modulation function being independent of the polarisation of the input light, wherein the photonic integrated circuit comprises:

the input waveguide;

a polarisation splitter, connected to the input waveguide, and configured to provide, at a first output, light in a first polarisation mode of the two polarisation modes and, at a second output, light in a second polarisation mode of the two polarisation modes;

a first polarisation rotator, connected to the first output of the polarisation splitter, and configured to rotate light received therefrom from the first polarisation mode to the second polarisation mode;

an optoelectronic modulator, having a first modulation waveguide connected to the first polarisation rotator and a second modulation waveguide connected to the second output of the polarisation splitter, and configured to modulate light in each waveguide according to a modulation scheme;

a first intermediate waveguide and a second intermediate waveguide, connected respectively to the first modulation waveguide and the second modulation waveguide; and a polarisation combiner, connected to the first intermediate waveguide and the second intermediate waveguide, and configured to combine light received from each and provide the combined light to an output of the photonic integrated circuit as a modulated signal, wherein one of the first intermediate waveguide and the second intermediate waveguide comprises a second polarisation rotator configured to rotate light received therein from one of the first and second polarisation modes to the other of the first and second polarisation modes.

* * * * *